US006618691B1

(12) United States Patent
Hugo

(10) Patent No.: US 6,618,691 B1
(45) Date of Patent: Sep. 9, 2003

(54) EVALUATION OF ALARM SETTINGS

(75) Inventor: Alan Hugo, Danville, CA (US)

(73) Assignee: Alan J Hugo, Danville, CA (US)

( * ) Notice: Subject to any disclaimer, the term of this patent is extended or adjusted under 35 U.S.C. 154(b) by 0 days.

(21) Appl. No.: 09/649,227

(22) Filed: Aug. 28, 2000

(51) Int. Cl.$^7$ .......................... G05B 13/02; G06F 19/00
(52) U.S. Cl. ............................ 702/181; 700/30; 700/33
(58) Field of Search ................................ 702/179, 181, 702/187, 130, 132; 700/30, 33, 1

(56) References Cited

U.S. PATENT DOCUMENTS

| | | | | |
|---|---|---|---|---|
| 5,003,248 A | * | 3/1991 | Johnson | 324/121 R |
| 5,053,815 A | * | 10/1991 | Wendell | 399/10 |
| 5,099,436 A | * | 3/1992 | McCown et al. | 702/82 |
| 5,257,206 A | * | 10/1993 | Hanson | 700/273 |
| 5,293,323 A | * | 3/1994 | Doskocil et al. | 700/79 |
| 5,438,983 A | * | 8/1995 | Falcone | 340/573.1 |
| 5,493,729 A | * | 2/1996 | Nigawara et al. | 706/52 |
| 5,552,763 A | * | 9/1996 | Kirby | 340/501 |
| 5,704,713 A | * | 1/1998 | Kim et al. | 374/102 |
| 5,710,723 A | * | 1/1998 | Hoth et al. | 702/181 |
| 5,831,524 A | * | 11/1998 | Tice et al. | 340/506 |
| 5,997,167 A | * | 12/1999 | Crater et al. | 700/79 |
| 6,260,188 B1 | * | 7/2001 | Ungpiyakul et al. | 717/1 |
| 6,308,141 B1 | * | 10/2001 | Saito et al. | 425/542 |
| 6,459,939 B1 | * | 10/2002 | Hugo | 700/44 |

OTHER PUBLICATIONS

Hanb, et al., "A Probabilistic Approach to Run–to–Run Control", IEEE, 1998.*
MacGregor, J.F. "On–Line Statistical Process Control" Chem Eng. Prog 84, (10) pp 21–31, 1988.

* cited by examiner

Primary Examiner—Patrick Assouad

(57) ABSTRACT

A method for evaluating alarm settings for continuous or semi-continuous processes that gives an indication of the probability that an alarm will occur for values preceding the alarm value, and the probability that the process will continue on to a value following the alarm value. The technique requires only a history of alarm events and process measurements.

3 Claims, 3 Drawing Sheets

EVALUATION OF ALARM SETTINGS

CROSS-REFERENCE TO RELATED APPLICATIONS

None

STATEMENT REGARDING FEDERALLY SPONSORED RESEARCH AND DEVELOPMENT

N/A

BACKGROUND

Field of Invention

This invention relates to a technique to evaluate current alarm settings for continuous and semi-continuous processes. The historical record of the alarm events and process measurements is used to determine alarm settings that balance providing adequate warning with minimizing false alarming during normal operation.

Semi-continuous processes are defined as processes that have discrete states, but the states may be transformed into continuous form. For instance, a measurement of discrete events is reformulated as discrete events per minute.

BACKGROUND

Discussion of Prior Art

Alarms are often applied to process measurements to indicate that an event is likely to occur in the near future. There is a trade-off in determining the actual alarm setting. If it is set too near to the actual event, it will not provide adequate warning of the event. If it is set too close to normal operation, it will indicate an incipient event condition even though the process is still within a safe range. An event is defined as an undesirable situation such as an outage of service or a hazardous operating condition, or any other condition that requires attention.

The actual value of the alarm is generally set in an informal way- either by a designer or by an operator. The designer knows the normal operation value and the event value, and, based often on heuristics, sets the alarm value somewhere in between. The designer does not in general know two critical pieces of information: the normal process variation, and the speed which the process can be brought back to safe conditions once an alarm has occurred. Operators may be more familiar with these values, but their knowledge may be limited; most alarms only occur occasionally, and they are usually not examining whether the alarm setting is optimal when an alarm occurs.

Standard Statistical Quality Control (SQC) techniques can be used to ascertain whether a process is in an alarm condition (see for example U.S. Pat. No. 5,257,206), but they are typically binary indicators (i.e., indicating either that the process is in or out of alarm), and are not designed to indicate the likelihood that the process is going to alarm in the near future. Furthermore, these techniques were developed for discrete parts, and several assumptions underlying their formulation are not strictly valid for continuous processes (MacGregor, J.F., *On-Line Statistical Process Control,* Chem. Eng. Prog., 84(10), 21–31, 1988). In addition, SQC techniques do not provide an indication of the continuance of the system after an alarm has occurred (as is considered in this patent application).

Another technique is to differentiate between normal and abnormal conditions is to use a deterministic model to compare the model predictions to actual conditions. For example, in U.S. Pat. No. 5,493,729, an expert system is employed to infer causal relationships between events. In U.S. Pat. No. 5,997,167, a deterministic model is coupled with normally-distributed model parameters to indicate the most likely state of the system, and then take appropriate action. The techniques of this application, in contrast, do not require a deterministic model as a statistical model (which will most likely not be based on a normal distribution) is constructed solely from past histories of the plant. Further, it is not an objective of this invention to model the behavior of the process or to determine whether a process should be in an alarm state, but more strictly to determine whether the current alarm setting is acceptable, and whether future alarms can be predicted.

BRIEF SUMMARY OF THE INVENTION

It is a feature of the present invention to provide a method to determine the most desirable alarm settings for a continuous or semi-continuous process, and to evaluate the effectiveness of the current settings. It is, also, a feature of the present invention that it only requires normal operating data to determine the most desirable settings and evaluate the current settings. Yet another feature of the present invention is that the identified alarm setting adequately reflects the objectives of providing adequate operator warning and minimizing false alarming.

Additional features and advantages of the invention will be set forth in part in the description that follows, and will in part be apparent from the description, or may be learned from practice of the invention. The features and advantages of the invention may be realized by means of the combinations and steps pointed out in the appended claims.

Accordingly, objects and advantages of the present invention are:

a) to determine desirable alarm settings for continuous and semi-continuous processes using only normal operating data;

b) to evaluate the effectiveness of the current settings;

c) to indicate the ramifications of changing the alarm setting over a range of values.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE INVENTION

Figure 1:
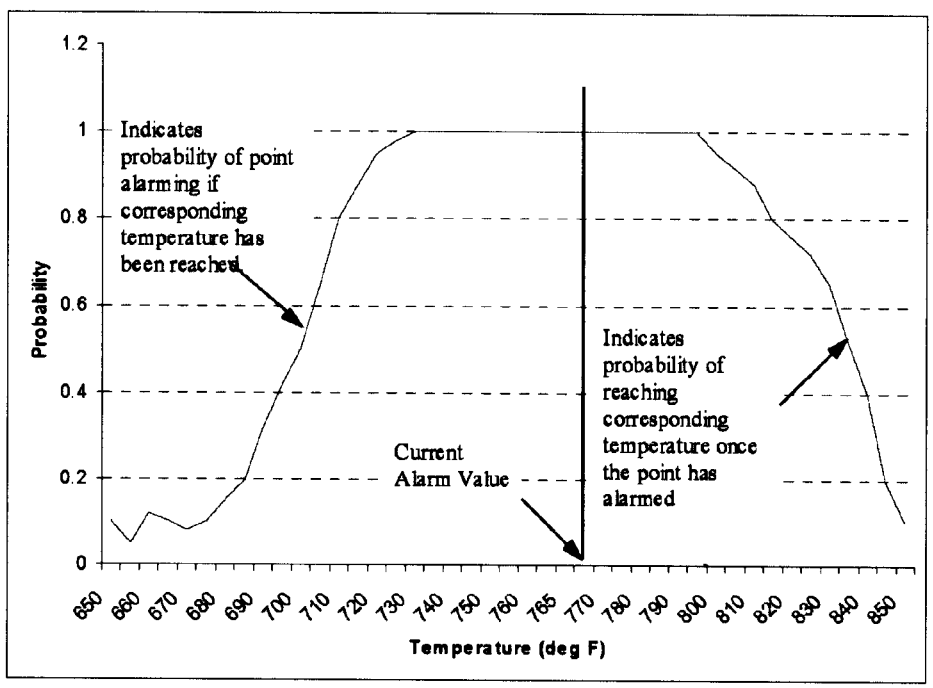
FIG. 1 is a typical representation of two probability curves that are generated by the present invention.
Figure 2:
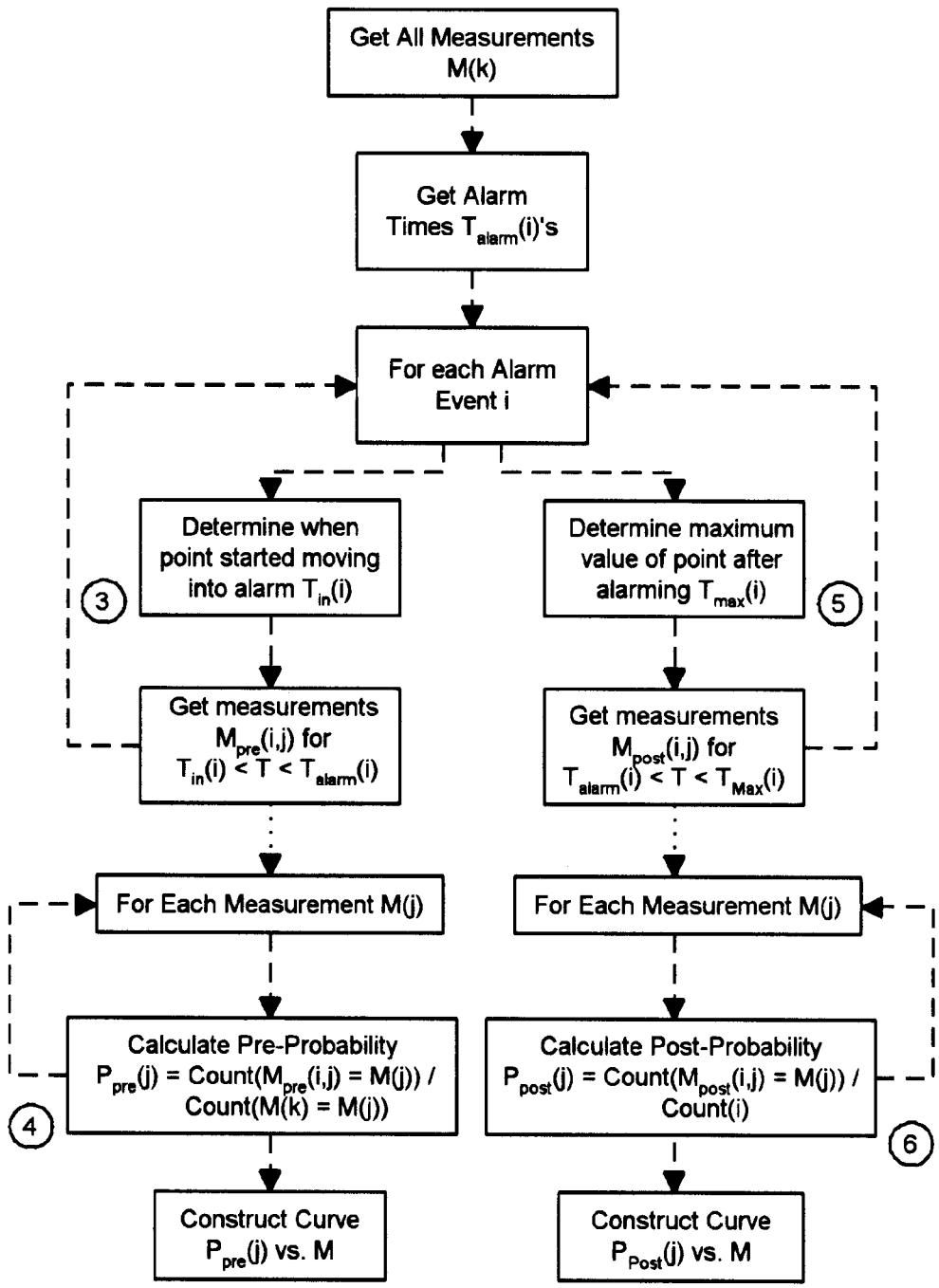
FIG. 2 is a flow chart for the methodology of this patent application.
Figure 3:
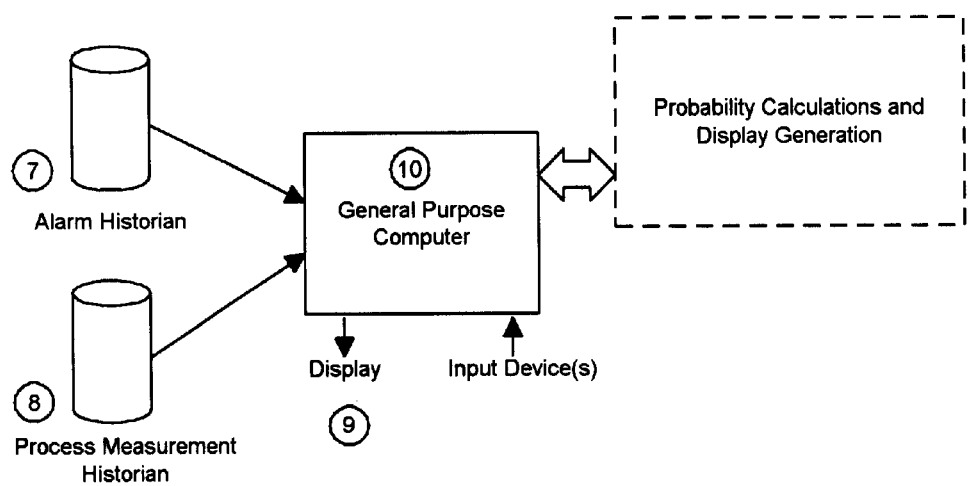
FIG. 3 is a schematic illustration of the computer system used to calculate the probability plots in accordance with the present invention. The probability plot generation and construction is performed in a program in the general purpose computer.

The determination of desirable alarm settings using historical data requires historized values of the alarm time and setting 7, as well as historized values of the measurement on which the alarm is based 8. From this data, two curves may be generated and drawn of probability vs. process measurement using a general purpose computer 10. The first curve 1 (termed a pre-probability plot) indicates the probability the process will continue in the same direction until an alarm occurs once the process reaches a specified value. The second curve 2 (termed a post-probability plot) indicates the probability that the process will reach a specified value once an alarm has occurred.

FIG. 1 is an example of these pre- and post-probability plots. Note that both plots can be represented by one curve, as they meet with a probability of one at the alarm setting.

The first part of the curve, which represents the behavior of the system prior to an alarm, is constructed by determining the time frame for each alarm event between when the measurement started heading in the direction of the alarm to the alarm time 3. For each measurement value, the ratio of the number of occurrences of this value in the time frame to the total number of occurrences of this value in the dataset is the probability of the process going into alarm if the corresponding value is reached 4.

The later part of the curve, which represents the behavior of the system after an alarm, is calculated by counting the number of times the process reaches a value after an alarm has occurred 5 and dividing this by the number of alarm events 6. This gives the probability of the process reaching a value given that an alarm has occurred.

Additional Embodiments:

1) The results may be represented as numbers of occurrences rather than probabilities.
2) Other numeric techniques may be employed to determine the probabilities or their equivalents.
3) Other visual (such as color) or audible systems may be used to indicate the probability of an alarm.
4) The algorithm may be formulated so that the results are updated automatically each time an alarm occurs.
5) The technique may be used in an on-line method where the results are automatically updated on a scheduled or event basis and the results presented to a user in real-time.
6) The methodology may be used with rate-of-change alarms instead of absolute alarm values.
7) Additional information such as other measurements may be used to calculate the results.

CONCLUSIONS, RAMIFICATIONS, AND SCOPE

Accordingly, the reader will see that the method described herein is able to indicate the proper setting of an alarm for a continuous or semi-continuous process. This method indicates both the probability that the process will continue in the same direction until an alarm occurs for a given value preceding the alarm value, and the probability that a specified value following the alarm value will be attained given that an alarm has occurred. This method requires only a history of the alarm occurrences and process measurements.

Although the description above contains many specificities, these should not be construed as limiting the scope of the invention but as merely providing illustrations of some of the preferred embodiments of the invention.

Thus the scope of the invention should be determined by the appended claims and their legal equivalents, rather than the derivations given.

What is claimed is:

1. A novel method for evaluating the setting of an existing alarm applied to a continuous or semi-continuous process, the method comprising:
   a. steps for retrieving a historical record of past alarm values and associated times and past process measurements and associated times;
   b. steps for calculating two probability curves representing pre and post probabilities of the measurement in relation to the alarm from said historical record of past alarms and past process measurements;
   c. steps for displaying the said probabilities, either in numerical or graphical form.

2. The method of claim 1 wherein the said pre-probabilities comprise the probability that a given process value will continue moving in the same direction until a given alarm value occurs for a range of process values.

3. The method of claim 1 wherein the said post-probabilities comprise the probability that a given process value following a given alarm value will be attained if the said alarm value has been reached by the measurement of the said process for a range of process values.

* * * * *